UNITED STATES PATENT OFFICE.

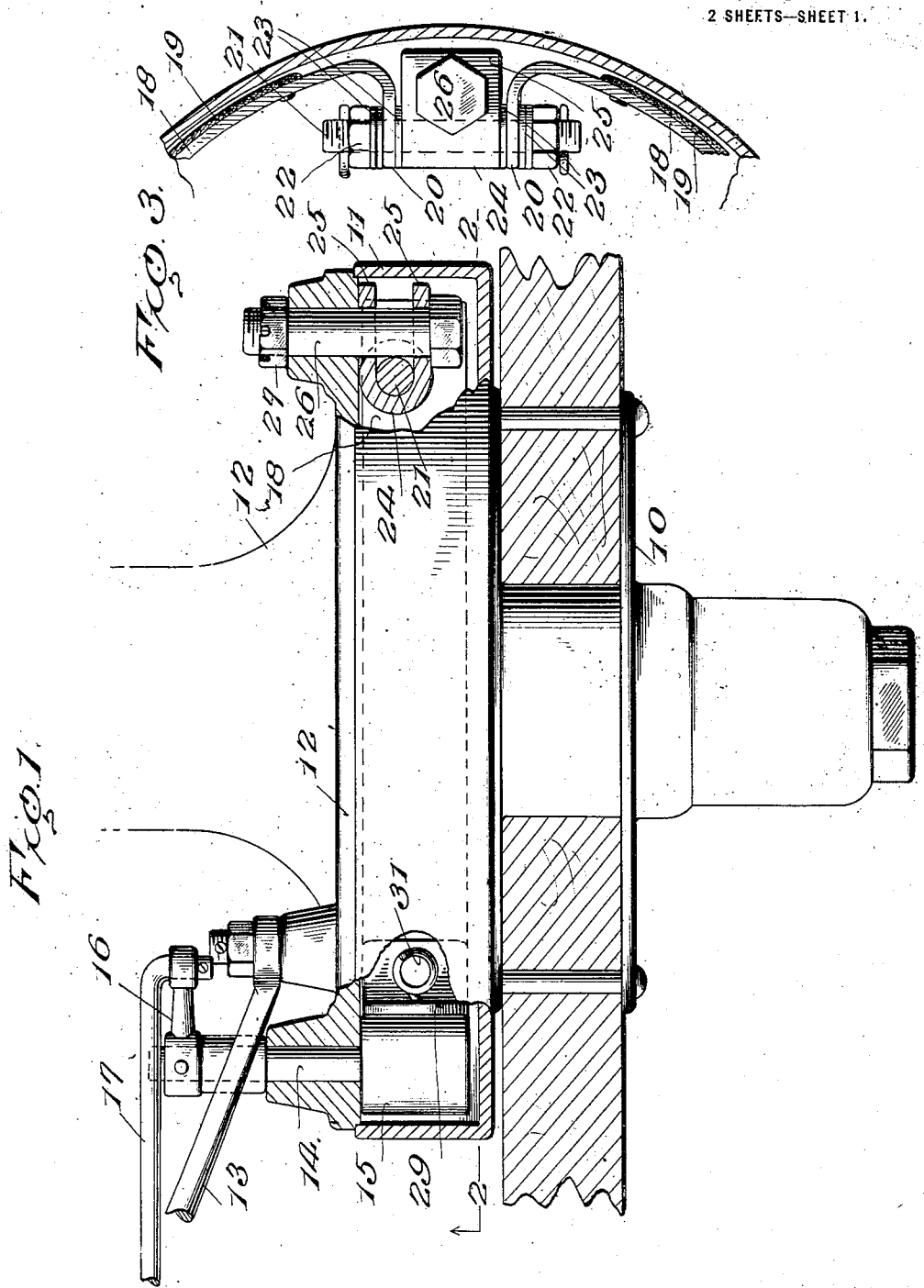

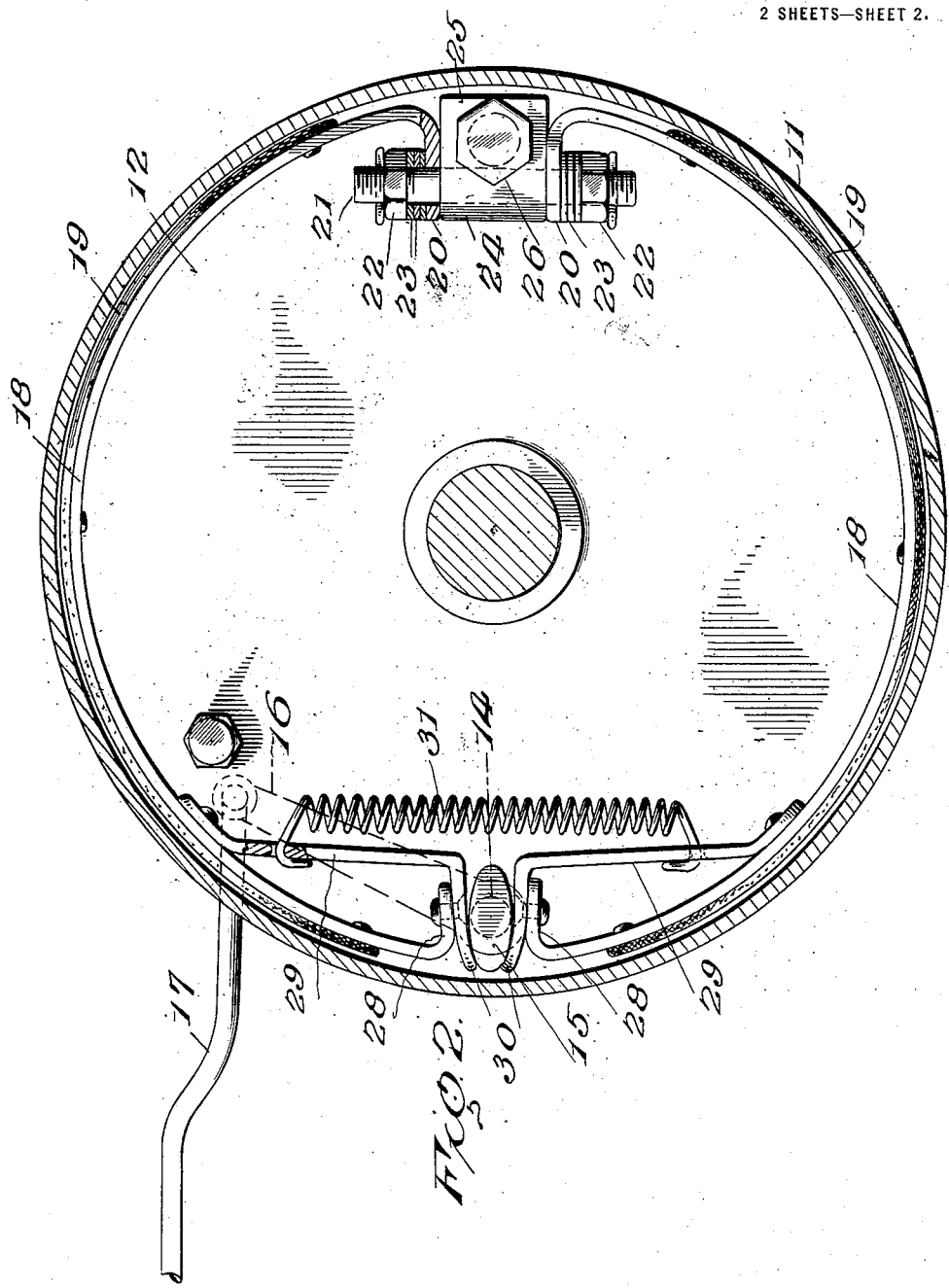

JOSEPH O. MICHAUD, OF FORT KENT, MAINE.

INTERNAL-EXPANDING BRAKE.

1,313,317.          Specification of Letters Patent.      Patented Aug. 19, 1919.

Application filed March 5, 1918. Serial No. 220,521.

*To all whom it may concern:*

Be it known that I, JOSEPH O. MICHAUD, a citizen of the United States, residing at Fort Kent, in the county of Aroostook and State of Maine, have invented certain new and useful Improvements in Internal-Expanding Brakes, of which the following is a specification.

This invention relates to an improved internal expanding brake for motor vehicles and has as its primary object to provide a construction wherein the brake shoes may be adjusted for taking up wear in the brake linings.

The invention has as a further object to provide a brake wherein the brake shoes will be mounted upon a common supporting pin therefor and wherein the said pin will be connected with the rear axle housing of the vehicle by an improved attaching clip for the said pin.

A still further object of the invention is to provide an arrangement wherein washers or liners may be interposed between the inner ends of the brake shoes and the attaching clip for spacing the shoes radially to take up wear in the brake linings, and wherein the pin will be adapted to carry a supply of the washers so that adjustment of the brake shoes may be easily made at any time.

And a still further object of the invention is to provide a construction wherein the brake shoes will be equipped with improved bracket arms or plates to coact with the cam employed for actuating the brake shoes.

Other and incidental objects will appear as the description proceeds. In the drawings wherein I have illustrated the preferred embodiment of the invention, and wherein similar reference characters designate corresponding parts throughout the several views:

Figure 1 is a fragmentary plan view showing my improved brake in connection with the brake drum of one rear wheel of a conventional type of motor vehicle, certain of the parts being broken away and shown in section to more clearly illustrate the mounting of the brake shoes upon the rear axle housing of the vehicle.

Fig. 2 is a sectional view taken on the line 2—2 of Fig. 1 and looking in the direction of the arrows, this view showing the normal position of the brake shoes prior to the adjustment thereof for taking up wear in the brake linings, as well as the construction of the brackets or plates employed upon the brake shoes to coöperate with the operating cam of the brake, and Fig. 3 is a fragmentary sectional view illustrating the manner in which the brake shoes are adjusted.

In order that the construction, mounting and operation of my improved brake may be accurately understood I have, in the drawings, shown the device in connection with the brake drum of one rear wheel of a conventional type of motor vehicle. The wheel is indicated at 10. Connected with the wheel hub is a brake drum 11. One end of the rear axle housing of the vehicle is shown at 12, and as usual, one of the rear radius rods 13 is connected to this housing at its adjacent terminal. Journaled through the housing at the forward side thereof is the usual hub brake cam shaft 14 upon the inner end of which is mounted a cam 15 received within the brake drum 11. Secured upon the outer end of the said shaft is a crank 16 to which is connected a brake rod 17. Coming now more particularly to the subject of the present invention, I employ companion substantially semi-circular brake shoes 18. These brake shoes are formed of suitable resilient metal and, upon the outer sides thereof, are equipped with approved brake linings 19, confronting the drum 11. At their inner ends, the said shoes are bent to provide confronting inwardly directed radial lugs 20 and loosely fitted through these lugs is a chordal supporting pin or bolt 21. This pin is double-ended to provide a common adjusting means for both of the brake shoes and is threaded at its extremities to receive nuts 22. Interposed between the said nuts and the lugs 20 of the shoes are a plurality of washers 23. The purpose of these washers will presently appear.

Engaging the pin or bolt 21 between the lugs 20 of the shoes 18 is an attaching clip 24 for the said pin. This clip is preferably formed from a strip of suitable resilient sheet metal bent into substantially U-shape to provide parallel spring arms 25 and, as will be observed upon particular reference to Fig. 1 of the drawings, these arms are arranged to embrace the pin 21 which is snugly received within the bight of the clip. The clip is thus confronted at opposite sides thereof by the lugs 20 of the shoes and consequently serves to space said lugs apart. Loosely engaged through the clip arms 25 and extending through the rear axle housing 12 at the rear side thereof is an attaching bolt 26 disposed at substantially right angles to the pin 21 and, at its outer end, equipped with a nut 27. It will thus be seen that this nut is adjustable to clamp the clip 24 against the inner face of the rear axle housing for rigidly supporting the clip upon the said housing. Coincident with the adjustment of the nut 27 the arms 25 of the clip will be flexed toward each other to bind the pin 21 within the bight of the clip. The pin will, therefore, also be rigidly connected with the clip for firmly supporting the inner ends of the brake shoes. The bolt 26, therefore, not only provides a means for connecting the clip and consequently the brake shoes with the axle housing but also provides a means for adjusting the spring arms of the clip to bind the pin 21 in position upon the clip.

At their outer extremities, the brake shoes 18 are bent to provide confronting inwardly directed radial lugs 28 and supported at their outer extremities by these lugs are cam engaging brackets or plates. These brackets are formed with arms 29 occupying the position of a chord with respect to the brake shoes and are secured at their outer extremities by rivets or other suitable fastening devices to the inner sides of the said shoes. At their inner ends, the said arms are bent to provide laterally directed terminals or arms 30 extending radially outward between the lugs 28 and riveted or otherwise secured thereto. As particularly shown in Fig. 2, the arms 30 of the brackets are thus arranged to confront opposite sides of the cam 15 and are curved longitudinally to fit the opposite side faces of the cam, normally engaging with the cam adjacent their outer extremities. Formed in the arms 29 of the brackets are suitable openings and engaged in these openings are the terminals of a helical spring 31 acting to contract the brake shoes and normally hold the arms 30 of the brackets in engagement with the cam. Thus, it will be seen that when the rod 17 is operated in the usual manner to rock the cam 15, the brake shoes will be expanded to engage the linings 19 of the said shoes with the brake drum. Upon the release of the said rod the spring 31 will immediately shift the shoes away from the drum. In this connection, it will be noted that when the cam is operated to spread the brake shoes, the cam will ride over the curved faces of the arms 30 of the brackets with a minimum of friction so that any tendency of the cam to shift the inner ends of the brake shoes radially inward will be reduced to a minimum. Furthermore, the longitudinal curvature of the bracket arms 30 will tend to support the brake shoes from the cam to uniformly hug the brake drum.

Attention is now directed to the fact that when the brake shoes are initially installed the clip 24 is of a width to support the said shoes properly coöperating with the brake drum. However, as the brake lining wears the brake will, of course, become less efficient. Under these conditions, one or more of the washers 23 upon the pin 21 are removed from the position shown in Fig. 2 of the drawings and inserted, as shown in Fig. 3, between the lugs 20 of the brake shoes and the clip for spreading the shoes at their inner ends and consequently taking up the wear in the brake lining. The purpose of the washers 23, therefore, now becomes apparent and it will be seen that the brake shoes may thus be readily adjusted to compensate for wear in the brake lining, as such wear occurs. Furthermore, it will be seen that a supply of washers, as shown in Fig. 2, may normally be carried upon the pin 21, so that the brake shoes may be easily adjusted at any time desired.

It will, therefore, be seen that I have provided a particularly simple and efficient construction for the purpose set forth and while the brake of the present invention is particularly designed for use upon Ford automobiles still, it will be seen that the device may also be used with equal efficiency upon various other types of motor vehicles.

Having thus described the invention, what is claimed as new is:

1. An internal expanding brake including companion brake shoes, an attaching clip disposed between adjacent ends of the shoes, a pin carried by said clip and loosely receiving the said ends of the shoes whereby washers may be inserted between the said ends of the shoes and the clip for spreading the shoes with respect to each other, and means for expanding the said shoes.

2. An internal expanding brake including companion brake shoes, a substantially U-shaped attaching clip, a pin received within the bight of said clip and engaged with the adjacent ends of the shoes, the shoes being adjustable upon the said pin for spreading the shoes with respect to each other, means engaging through the arms of the clip for supporting the clip in active position and adjustable for clamping the clip about the said pin, and means for expanding the shoes.

3. An internal expanding brake including companion brake shoes free at their outer ends, brackets carried by the outer ends of said shoes and provided with arms directed between the outer ends of the shoes, means for contracting the shoes, and means disposed between the arms of said brackets for expanding the shoes, the said bracket arms being curved longitudinally to fit the confronting sides of the said last mentioned means.

4. An internal expanding brake including companion brake shoes, supporting means therefor having the inner ends of the shoes slidably engaged thereover, means having clamping engagement with the supporting means and holding said supporting means fixed, and means holding said shoe ends against displacement from the supporting means and operable to permit the adjustable spreading of the shoes toward the ends of said supporting means.

5. An internal expanding brake including companion brake shoes provided at their inner ends with openings, supporting means for the shoes slidably received through said openings, resilient means removably securing said supporting means in active position and clamped in engagement therewith, and means holding said shoe ends against displacement from the supporting means, and operable to permit the adjustable spreading of the shoes toward the ends of said supporting means.

6. An internal expanding brake including companion brake shoes, supporting means therefor having the inner ends of the shoes slidably engaged thereover, means holding the said shoe ends against displacement from the supporting means and operable to permit the spreading of the inner ends of the shoes upon said supporting means, attaching means for the supporting means and means for securing the attaching means in active position and adjustable to clamp the attaching means in engagement with the supporting means.

7. An internal expanding brake including companion brake shoes, supporting means therefor having the inner ends of the shoes slidably engaged thereover, means holding said shoe ends against displacement from the supporting means and operable to permit the spreading of the shoes upon said supporting means, attaching means embracing the supporting means, and means for securing the attaching means in active position and adjustable to clamp the attaching means in binding engagement with the supporting means.

8. An internal expanding brake including companion brake shoes, supporting means therefor, and liners normally carried in inactive position upon the supporting means, the liners being insertible beneath the inner ends of the shoes in active position for spreading the shoes.

9. An internal expanding brake including companion brake shoes, supporting means therefor having the inner ends of the shoes slidably engaged thereover, and liners removably fitted upon said supporting means and normally carried inactive thereon, the liners being insertible beneath the inner ends of the shoes upon said supporting means in active position for spreading the shoes.

10. An internal expanding brake including companion brake shoes, supporting means therefor having the inner ends of the shoes slidably engaged thereover, liners normally carried inactive upon the supporting means, and means carried by the supporting means for holding the liners against displacement and connecting the inner ends of the shoes with the supporting means, the said last mentioned means being removable to permit the insertion of the liners beneath the inner ends of the shoes in active position for spreading the shoes.

11. An internal expanding brake including companion brake shoes, supporting means therefor, liners normally carried inactive upon the supporting means, and means holding the liners against displacement from the supporting means, the liners being insertible beneath the inner ends of the shoes in active position for spreading the shoes.

In testimony whereof I affix my signature in presence of two witnesses.

JOSEPH O. MICHAUD. [L. S.]

Witnesses:
    THOS. D. DUFOUR,
    GUSSIE E. PINKHANN.